United States Patent
Huskamp et al.

(10) Patent No.: US 8,858,853 B2
(45) Date of Patent: Oct. 14, 2014

(54) FORMED SHEET METAL COMPOSITE TOOLING

(75) Inventors: Christopher S. Huskamp, St. Louis, MO (US); Gregg Miltenberger, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 472 days.

(21) Appl. No.: 12/062,994

(22) Filed: Apr. 4, 2008

(65) Prior Publication Data

US 2009/0250834 A1    Oct. 8, 2009

(51) Int. Cl.
| | | |
|---|---|---|
| B29C 70/30 | (2006.01) | |
| B29C 70/54 | (2006.01) | |
| B29C 70/34 | (2006.01) | |
| B21D 22/18 | (2006.01) | |
| B21D 31/00 | (2006.01) | |
| B21D 37/20 | (2006.01) | |
| B29C 33/42 | (2006.01) | |

(52) U.S. Cl.
CPC .............. B29C 70/54 (2013.01); B29C 70/345 (2013.01); B21D 22/18 (2013.01); B29C 33/42 (2013.01); B21D 31/005 (2013.01); B21D 37/20 (2013.01)
USPC ........... 264/219; 72/379.2; 264/257; 264/258

(58) Field of Classification Search
USPC .......................... 264/257, 258, 219; 72/379.2
See application file for complete search history.

(56) References Cited

U.S. PATENT DOCUMENTS

| | | | |
|---|---|---|---|
| 3,201,967 A | 8/1965 | Balamuth et al. | |
| 3,516,274 A | 6/1970 | Graham et al. | |
| 3,643,483 A | 2/1972 | Minchenko et al. | |
| 4,071,097 A | 1/1978 | Fulop et al. | |
| 4,129,027 A | 12/1978 | Ignashev et al. | |
| 4,828,052 A | 5/1989 | Duran et al. | |
| 4,947,668 A | 8/1990 | Ostertag | |
| 5,419,791 A | 5/1995 | Folmer | |
| 5,759,325 A * | 6/1998 | Davis | 264/258 X |
| 5,771,729 A | 6/1998 | Bailey et al. | |
| 5,826,453 A | 10/1998 | Prevey, III | |
| 5,939,007 A * | 8/1999 | Iszczyszyn et al. | 264/258 |
| 6,216,508 B1 | 4/2001 | Matsubara et al. | |
| 6,532,786 B1 | 3/2003 | Luttgeharm | |
| 6,561,002 B2 | 5/2003 | Okada et al. | |

(Continued)

FOREIGN PATENT DOCUMENTS

WO    WO-2005049298 A1 *    6/2005

OTHER PUBLICATIONS

Lamminen et al., "Incremental Sheet Forming with an Industrial Robot", Materials Forum vol. 29, 2005, Institute of Materials Engineering Australasia Ltd., pp. 331-335.

U.S. Appl. No. 12/486,968, filed Jun. 18, 2009, Huskamp et al.

(Continued)

Primary Examiner — Leo B Tentoni
(74) Attorney, Agent, or Firm — Yee & Associates, P.C.

(57) ABSTRACT

A method and apparatus for manufacturing a tool for creating composite components. A sheet metal material is secured over a forming tool in an incremental sheet metal forming machine. The sheet metal material is incrementally shaped with a stylus to form a shape for the tool. The tool is removed from the incremental sheet metal forming machine when the shape for the tool is complete. Composite materials on the tool are laid up, wherein the shape of the tool provides a desired shape for a composite component.

15 Claims, 6 Drawing Sheets

(56) References Cited

U.S. PATENT DOCUMENTS

| | | | |
|---|---|---|---|
| 6,622,570 B1 | 9/2003 | Prevey, III | |
| 6,736,729 B2 | 5/2004 | Wang | |
| 6,745,609 B2 | 6/2004 | Garnett et al. | |
| 6,748,780 B1 | 6/2004 | Luttgeharm | |
| 6,755,064 B2 | 6/2004 | Butscher et al. | |
| 6,764,057 B2 | 7/2004 | Fanucci et al. | |
| 6,779,708 B2 | 8/2004 | Slattery | |
| 6,823,705 B2 | 11/2004 | Fukuda et al. | |
| 6,910,616 B2 | 6/2005 | Halley et al. | |
| 6,971,256 B2 | 12/2005 | Okada et al. | |
| 7,066,375 B2 | 6/2006 | Bolser | |
| 7,079,996 B2 | 7/2006 | Stewart et al. | |
| 7,083,076 B2 | 8/2006 | Slattery | |
| 7,128,948 B2 | 10/2006 | Slattery | |
| 7,156,276 B2 | 1/2007 | Slattery | |
| 7,225,967 B2 | 6/2007 | Slattery | |
| 7,243,517 B2 | 7/2007 | Sieger | |
| 7,347,351 B2 | 3/2008 | Slattery | |
| 7,353,978 B2 | 4/2008 | Slattery et al. | |
| 7,381,446 B2 | 6/2008 | Slattery | |
| 7,398,911 B2 | 7/2008 | Slattery et al. | |
| 7,431,194 B2 | 10/2008 | Slattery | |
| 7,479,201 B1 * | 1/2009 | Wegner et al. | 264/257 X |
| 7,509,725 B2 | 3/2009 | Huskamp et al. | |
| 7,515,986 B2 | 4/2009 | Huskamp | |
| 7,536,892 B2 | 5/2009 | Amino et al. | |
| 7,607,225 B2 | 10/2009 | Huskamp et al. | |
| 7,669,750 B2 | 3/2010 | Slattery et al. | |
| 7,841,504 B2 | 11/2010 | Slattery et al. | |
| 7,854,363 B2 | 12/2010 | Slattery et al. | |
| 7,971,463 B2 | 7/2011 | Forrest et al. | |
| 8,033,151 B2 | 10/2011 | Castle et al. | |
| 8,177,113 B2 | 5/2012 | Slattery | |
| 2002/0088549 A1 | 7/2002 | Fanucci et al. | |
| 2003/0154757 A1 | 8/2003 | Fukuda et al. | |
| 2003/0168494 A1 | 9/2003 | Halley et al. | |
| 2004/0004108 A1 | 1/2004 | Halley et al. | |
| 2004/0094604 A1 | 5/2004 | Halley et al. | |
| 2004/0112941 A1 | 6/2004 | Slattery | |
| 2004/0148997 A1 | 8/2004 | Amino et al. | |
| 2005/0084701 A1 | 4/2005 | Slattery | |
| 2005/0127139 A1 | 6/2005 | Slattery et al. | |
| 2005/0127140 A1 | 6/2005 | Slattery | |
| 2006/0016854 A1 | 1/2006 | Slattery | |
| 2006/0037992 A1 | 2/2006 | Slattery | |
| 2006/0059848 A1 | 3/2006 | MacDonald-Schmidt et al. | |
| 2006/0060635 A1 | 3/2006 | Slattery et al. | |
| 2006/0150710 A1 | 7/2006 | Moyse et al. | |
| 2006/0236544 A1 | 10/2006 | Huskamp et al. | |
| 2006/0272378 A1 * | 12/2006 | Amino et al. | 72/305 |
| 2007/0014983 A1 | 1/2007 | Slattery | |
| 2007/0050979 A1 | 3/2007 | Husamp et al. | |
| 2007/0075121 A1 | 4/2007 | Slattery | |
| 2007/0186507 A1 | 8/2007 | Slattery | |
| 2008/0262659 A1 | 10/2008 | Huskamp | |
| 2008/0276566 A1 | 11/2008 | Slattery et al. | |
| 2008/0277451 A1 | 11/2008 | Slattery et al. | |
| 2009/0172962 A1 | 7/2009 | Aubele et al. | |
| 2010/0257909 A1 | 10/2010 | Huskamp et al. | |
| 2010/0257910 A1 | 10/2010 | Castle et al. | |
| 2011/0036139 A1 | 2/2011 | Slattery | |

OTHER PUBLICATIONS

U.S. Appl. No. 12/486,960, filed Jun. 18, 2009, Young et al.
U.S. Appl. No. 12/420,399, filed Apr. 8, 2009, Huskamp et al.
U.S. Appl. No. 12/420,433, filed Apr. 8, 2009, Huskamp et al.
Pohlak et al., "Manufacturability and limitations in incremental sheet forming", Proc. Estonian Acad. Sci. Eng., 2007, pp. 129-139.
Notice of allowance dated Jun. 25, 2013 regarding U.S. Appl. No. 12/420,433, 36 pages.
Office action, dated Jun. 7, 2013, regarding U.S. Appl. No. 12/486,960, 24 pages.
Office action, dated Apr. 5, 2013, regarding U.S. Appl. No. 12/486,968, 18 pages.
Final Office Action, dated Dec. 10, 2012, regarding U.S. Appl. No. 12/486,968, 18 pages.
Final Office Action, dated Feb. 21, 2013, regarding U.S. Appl. No. 12/486,960, 26 pages.
Final Office Action, dated Dec. 17, 2013, regarding USPTO U.S. Appl. No. 12/486,960, 32 pages.
Office Action, dated Feb. 13, 2014, regarding USPTO U.S. Appl. No. 12/486,968, 12 pages.
USPTO office action for U.S. Appl. No. 12/420,399 dated Apr. 6, 2011.
Office Action, dated Sep. 5, 2013, regarding USPTO U.S. Appl. No. 12/486,968, 21 pages.
USPTO Office Action, dated Apr. 6, 2012, regarding U.S. Appl. No. 12/420,433, 25 pages.
USPTO office action dated Apr. 6, 2011 regarding U.S. Appl. No. 12/420,399, 8 Pages.
USPTO notice of allowance dated Jun. 21, 2011 regarding U.S. Appl. No. 12/420,399, 8 Pages.
USPTO office action dated Dec. 21, 2011 regarding U.S. Appl. No. 12/540,301, 11 Pages.
USPTO notice of allowance dated Jun. 1, 2012 regarding U.S. Appl. No. 12/540,301, 8 Pages.
Notice of Allowance issued on Jul. 20, 2012 for U.S. Appl. No. 12/540,301, 13 pages.
Office Action issued on Jul. 3, 2012 for U.S. Appl. No. 12/486,960, 26 pages.
Office Action issued on Jul. 3, 2012 for U.S. Appl. No. 12/486,968, 34 pages.
Final Office Action issued on Sep. 24, 2012 for U.S. Appl. No. 12/420,433, 23 pages.
Final Office Action, dated Jun. 27, 2014, regarding U.S. Appl. No. 12/486,968, 14 pages.

\* cited by examiner

FORMED SHEET METAL COMPOSITE TOOLING

BACKGROUND INFORMATION

1. Field

The present disclosure relates generally to manufacturing a component and in particular to manufacturing composite components. Still more particularly, the present disclosure relates to a method and apparatus for creating tools to manufacturing composite components.

2. Background

Aircraft are being designed and manufactured with greater and greater percentages of composite materials. Some aircraft may have more than fifty percent of its primary structure made from composite materials. Composite materials are used in aircraft to decrease the weight of the aircraft. This decreased weight improves performance features, such as payload capacities and fuel efficiencies. Further, composite materials provide longer service life for various components in an aircraft.

Composite materials are tough, light-weight materials, created by combining two or more dissimilar components. For example, a composite may include fibers and resins. The fibers and resins are combined and cured to form a composite material.

Further, by using composite materials, portions of an aircraft may be created in larger pieces or sections. For example, a fuselage in an aircraft may be created in cylindrical sections that may be put together to form the fuselage of the aircraft. Other examples include, for example, without limitation, wing sections joined to form a wing or stabilizer sections joined to form a stabilizer.

Composite components are typically created by laying up composite materials on a tool. This tool provides a form for the shape of the composite component. Composite materials are laid up on the tool in the shape of the composite component. Thereafter, the composite materials are cured. This curing process typically involves the use of heat and in some cases, heat and pressure.

The tools used to create the composite components are relatively expensive to create. As a result, when composite components are needed in short runs or limited quantities, the cost for these components are often greater than for composite components that are needed in larger numbers.

SUMMARY

The advantageous embodiments provide a method and apparatus for manufacturing a tool for creating composite components. A sheet metal material is secured over a forming tool in an incremental sheet metal forming machine. The sheet metal material is incrementally shaped with a stylus to form a shape for the tool. The tool is removed from the incremental sheet metal forming machine when the shape for the tool is complete. Composite materials on the tool are laid up, wherein the shape of the tool provides a desired shape for a composite component.

In another advantageous embodiment, a method is present for manufacturing a component. A sheet metal material is secured into an incremental sheet metal forming machine. The sheet metal material is shaped with a stylus to form a shape for the component. The shape is removed from the incremental sheet metal forming machine. An inner mold is formed on an inner surface of the shape. An outer mold is formed on an outer surface of the shape, wherein the inner mold and the outer mold form a two piece mold for the component.

In yet another advantageous embodiment, an apparatus comprises an incremental sheet forming machine, a composite material layup machine, and an oven. The incremental sheet forming machine incrementally shapes a sheet metal material with a stylus to form a shape for a tool. The composite material layup machine places a composite material on the tool for a composite component. The oven cures the composite material on the tool to form the composite component.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
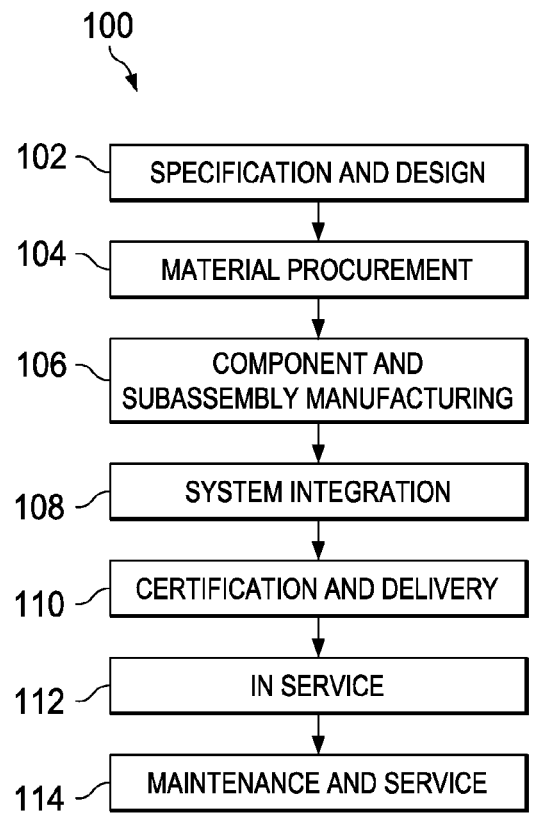
FIG. 1 is a diagram illustrating an aircraft manufacturing and service method in accordance with an advantageous embodiment.
Figure 2:
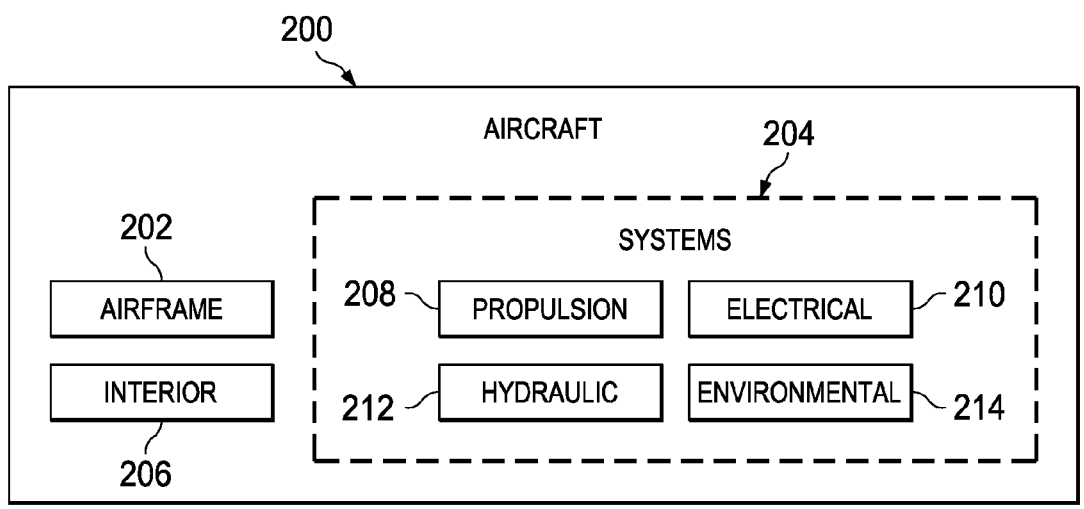
FIG. 2 is a diagram of an aircraft in which an advantageous embodiment may be implemented.

Referring more particularly to the drawings, embodiments of the disclosure may be described in the context of the aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104. During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1. Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

The different advantageous embodiments recognize that the creation of tooling for limited quantities of composite parts may increase those costs. Additionally, the different advantageous embodiments recognize that currently used tools for creating composite parts have a mass that results in thermal lag. In other words, before the composite materials can be cured at a selected temperature, the tool also needs to reach that temperature. Otherwise, the tool acts as a heat sync and draws heat away from the composite materials.

The different advantageous embodiments recognize that the cost of creating tools for composite parts is a limitation in the implantation of the short run or prototype composite parts. Some presently used solutions involve machine poly-block or other inexpensive materials that may be used in place of metal and other materials normally used for composite component tools. These types of materials are lower in cost than metals or other materials used in tools. These types of materials, however, require a high amount of tooling materials that is consumed to produce parts.

In other words, the materials for these types of tools are soft relative to metals. As well, these types of tools are easily damaged as compared to metal tools. As a result, although the materials may be cheaper, the additional tooling or tools needed to replace damaged tools often do not provide cost or time savings.

Another alternative technique is a spline sweep technique, which is more artistic and technical. The drawback of using this technique as an alternative process for creating tools is that the process is not as dimensionally accurate as desired. Further, this technique is labor intensive and requires a significant amount of time. Another technique is a splash technique. This technique consumes both a high amount of time and tooling materials because masters instead of molds are produced using this machining method. A composite splash is laid up, bagged, debulk, cured, and then finished.

Therefore, the different advantageous embodiments recognize that it would be advantageous to have a technique to generate tooling for a composite manufacturing process without requiring the cost and time needed by current techniques. Further, it would be advantageous to have a method and apparatus to generate tools that are not easily damaged as compared to machine poly-block or other inexpensive materials.

As a result, the different advantageous embodiments provide a method for manufacturing a tool to create composite components. A sheet metal material is secured over a forming tool in an incremental sheet forming machine. The sheet metal material is incrementally shaped using a stylus to form a shape for the tool. Once the shape is formed, the shape is removed from the sheet on the machine and composite materials may be laid upon the tool. The shape of the tool provides the desired shape of the composite component.

In other advantageous embodiments, the shape forms a master or buck from which a mold may be made. Unlike previous techniques, the amount of time needed to make this shape as compared to other techniques is much less and is less expensive. From the master, a two piece mold may be made from which various composite components may be formed.

Figure 3:
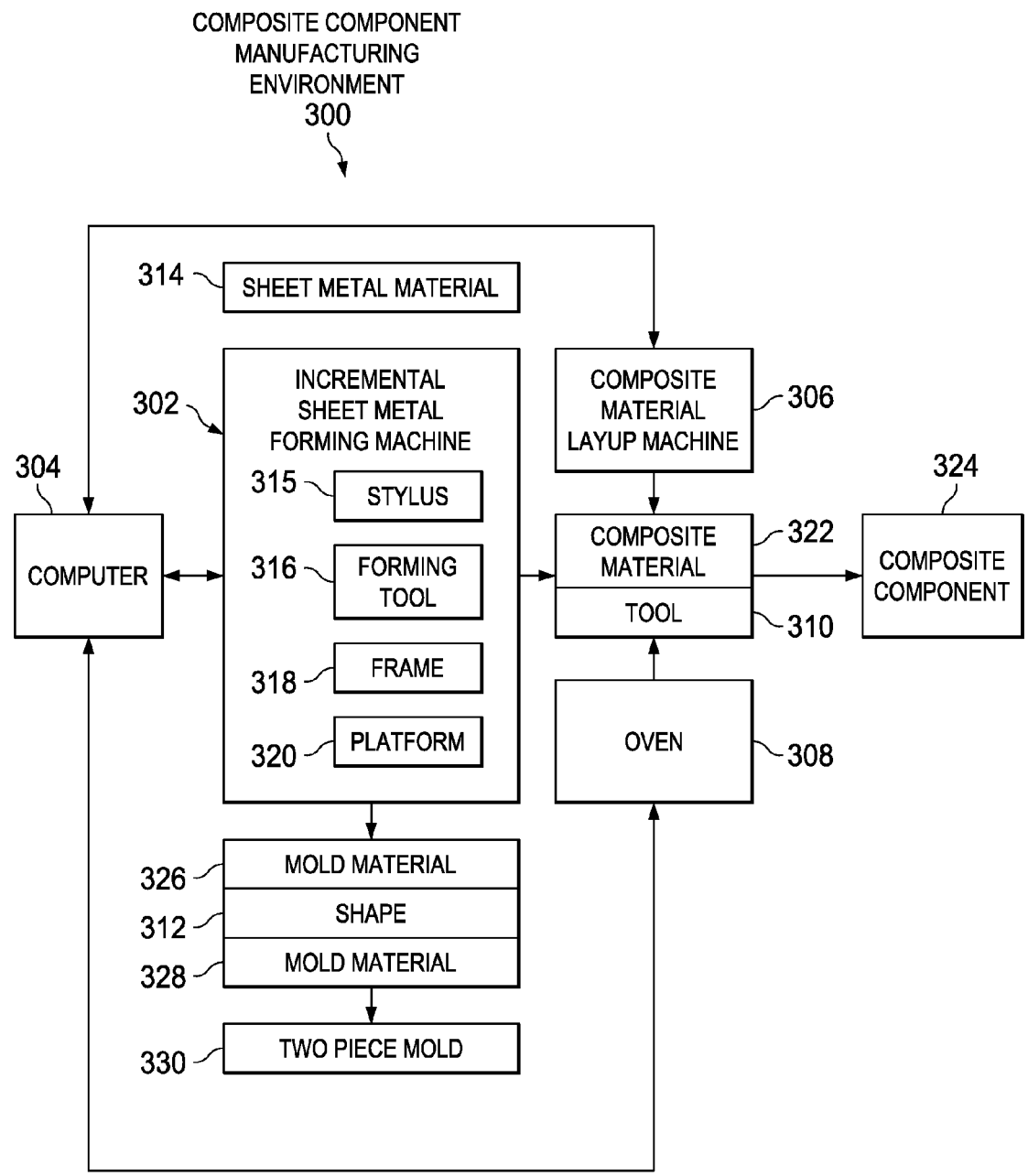
FIG. 3 is a block diagram of a composite component manufacturing environment in accordance with an advantageous embodiment.

With reference now to FIG. 3, a block diagram of a composite component manufacturing environment is depicted in accordance with an advantageous embodiment. In this example, composite component manufacturing environment 300 includes incremental sheet metal forming machine 302, computer 304, composite material layup machine 306, and oven 308. Computer 304 is a controller used to control the operation of incremental sheet metal forming machine 302, composite material layup machine 306, and oven 308. Of course, in some other implementations, computer 304 may take the form of separate computers integrated within the different machines.

In the different advantageous embodiments, incremental sheet metal forming machine 302 may be used to create tool 310 or shape 312. Sheet metal material 314 is placed into incremental sheet metal forming machine 302. In particular, incremental sheet metal forming machine 302 contains stylus 315, forming tool 316, frame 318, and platform 320. Sheet metal material 314 may be held in place in frame 318. Forming tool 316 may be secured on platform 320. In these advantageous embodiments, forming tool 316 provides an initial form or place for the shape of tool 310 or shape 312 to be formed.

Stylus 315 applies pressure to sheet metal material 314 to create a desired shape in sheet metal material 314. This shape is incrementally created. In other words, the desired shape is not formed in a single motion as in die stamping or brake press machines. In other words, the shape is formed a little bit at a time, which is referred to as incremental shape metal forming. The shape is with respect to stylus 315.

Further, stylus 315 also may move relative to these components to create the shape in sheet metal material 314. In the different advantageous embodiments, frame 318 may move along an X and Y axis while stylus 315 moves alone a Z axis.

In other advantageous embodiments, platform 320 may move along the Z axis. Of course, other types of movement may occur depending of the particular implementation of incremental sheet metal forming machine 302. Once the shaping of sheet metal material 314 is completed, tool 310 is formed, or shape 312 is formed.

In one advantageous embodiment, tool 310 is the result of the shaping of sheet metal material 314. Tool 310 is a tool for laying up composite material 322. Composite material 322 is laid up on tool 310 using composite material layup machine 306. Various types of machines may be used to implement composite material layup machine 306. For example, a tape layup machine or some other composite material layup machine may be used.

An example of a material placement machine that that may be used to implement composite material layup machine 306 is an M. Torres layup, which is a tape layer machine available from M. Torres. Another example is Access-Atlas which is a composite working machine available from Forest-Liné. Yet another example of a machine that may be used is an Ingersoll Automated Tape Lamination Machine (ATLM), which is available from Ingersoll Machine Tools, Inc. Another example is an Automated Fiber Placement Machine (AFPM).

In these advantageous embodiments, tool 310 is a thin and light tool as compared to currently available tools used to layup composite materials.

Sheet metal material 314 may have different thicknesses. For example, without limitation, sheet metal material 314 may have a thickness of around 0.060 inches, 0.080 inches, 0.011 inches, or some other suitable thickness. Sheet metal material 314 may take various forms. For example, sheet metal material 314 may be made of materials well known in the composite tooling art, such as, alloys containing steel, aluminum, titanium, nickel, or some other suitable metal material. An example of a commonly used material for composite materials is Invar®, which is a form of 36FeNi and is a steel nickel alloy that has a uniquely low coefficient of thermal expansion. Of course, these materials are only examples and other materials may be used in addition to, or in place of, the materials listed.

Through the use of sheet metal material 314, the thickness of tool 310 is less than that of currently available tools used to layup composite components. The thickness of currently available tools may be, for example around 0.25 inches to 0.5 inches thick. As a result, the amount of time needed to manufacture composite components may be reduced because of the lower thermal lag. In other words, the amount of time needed to heat up tool 310 to the curing temperature is less than that of currently available tools created by conventional processes. Further, tool 310 is lightweight and relatively inexpensive to manufacture as compared to currently used tools.

Additionally, tool 310 also may include support or other forms needed to provide additional structural integrity for tool 310 if needed. These additional structural components may be placed on the side opposite to the surface in which composite material 322 is placed. Further, with the use of a metal material, tool 310 has a high wear resistance as compared to poly-block or any of the board materials.

Further, any damage that may occur to tool 310 is more easily repaired. Also, the metallic surface of tool 310 makes this component integral for vacuum bagging of parts that may be produced. Tool 310 has a coefficient of thermal expansion that may be controlled through the selection of the material for sheet metal material 314. Additionally, the thin wall construction facilitates rapid heating and cooling cycles, which may reduce the time and cost to process composite material to form composite components.

In these illustrative examples, after composite material 322 is laid up on tool 310, tool 310 is placed into oven 308 and composite material 322 is cured. Once composite material 322 is cured, composite component 324 is formed.

Oven 308 generates the heat necessary to cure composite material 322. Oven 308 may be, for example, a composite curing oven in which heat and pressure may be applied to composite material 322 laid up on tool 310. Oven 308 may provide temperatures around 350 degrees to cure composite material 322. In these examples, oven 308 may be, for example, an autoclave. Of course, any type of oven capable of curing composite parts may be used in the different advantageous embodiments. In addition to a thermal curing process employed in oven 308, other types of curing processes also may be used to cure composite material 322. For example, an electron beam system may be used to cure composite material 322 instead of using a thermal curing system.

Incremental sheet metal forming machine 302 may be implemented in any available incremental sheet forming machine. For example, a Dieless NC forming machine available from Amino Corporation may be used to implement incremental sheet metal forming machine 302.

In another advantageous embodiment, sheet metal material 314 forms shape 312. Shape 312 is a master of the shape for the desired component. Mold material 326 and mold material 328 may be applied to either side of shape 312. For example, mold material 326 may be applied to the top side of shape 312, while mold material 328 may be applied to the bottom side of shape 312. These materials are cured to form two piece mold 330.

Two piece mold 330 may then be used to create composite component 324. The space left between these two molds may be used to form various composite components. For example, mold materials 326 and 328 may take the form of three thread fiberglass materials. Of course, other materials may be used to form two piece mold 330. In the different advantageous embodiments, a material similar to the component beam created is typically used to create two piece mold 330. In this manner, the expansion and retraction during heating and curing processes may more closely match that of the material used to form a composite component.

Figure 4:
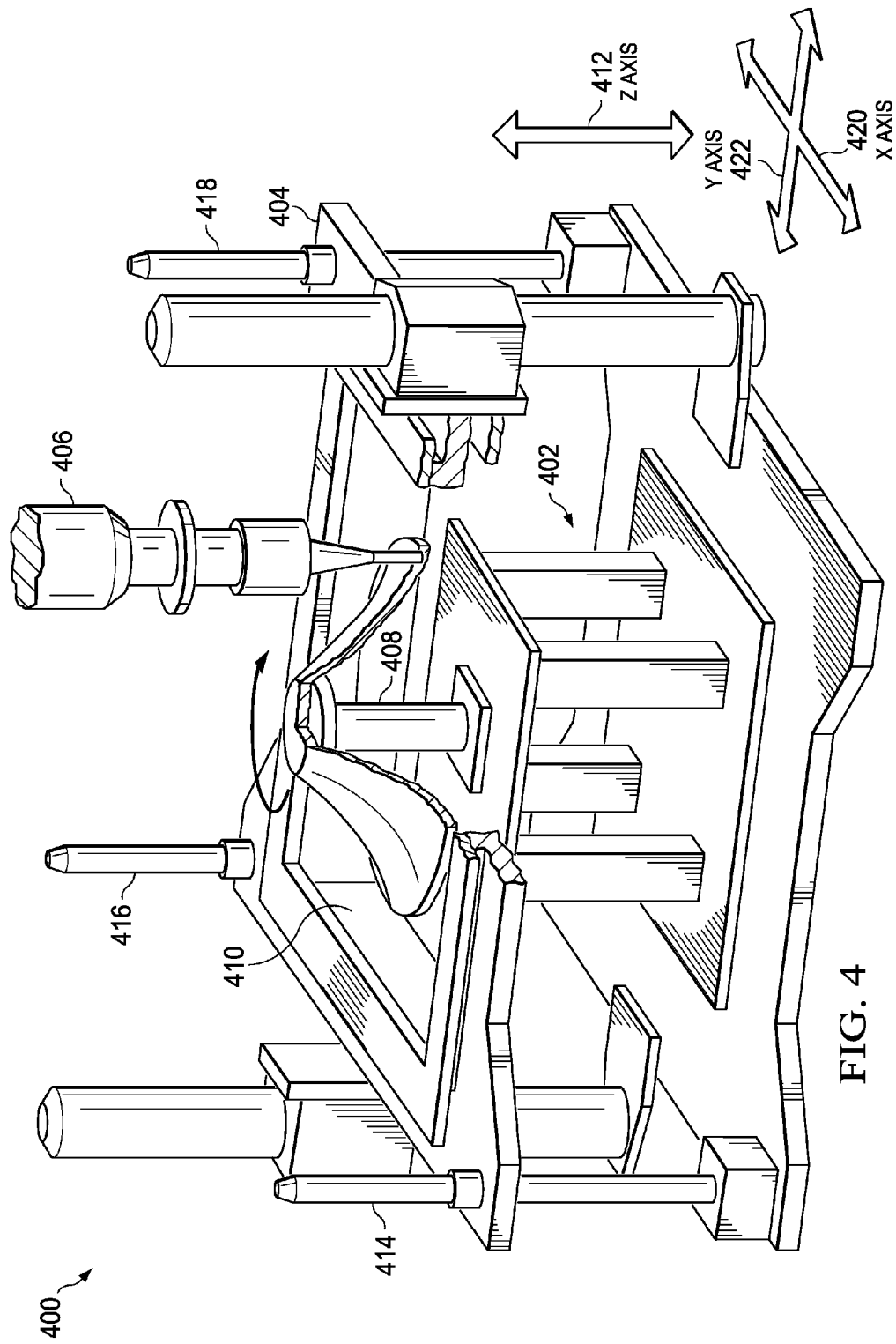
FIG. 4 is a diagram illustrating components in an incremental sheet metal forming machine in accordance with an illustrative embodiment.

Turning now to FIG. 4, a diagram illustrating components in an incremental sheet metal forming machine is depicted in accordance with an illustrative embodiment. In this example, sheet metal forming machine 400 is an example of a sheet metal forming machine, such as incremental sheet metal forming machine 302 in FIG. 3. In this example, incremental sheet metal forming machine 400 includes platform 402, frame 404, stylus 406, and forming tool 408.

Sheet metal material 410 is secured to frame 404. Frame 404, in these examples, takes the form of a clamp plate that is movable along Z axis 412. Frame 404 may move along the Z axis along guide posts 414, 416, and 418. Another guidepost is present, but not shown in this cut away view. Platform 402 is movable along X axis 420 and Y axis 422 in these examples. In other advantageous embodiments, frame 404 may be stationery, while platform 402 is moveable along Z axis 412.

As illustrated, forming tool 408 may move along Z axis 412, while platform 402 moves along X axis 420 and Y axis 422. Stylus 406 may move downward to create a shape for sheet metal material 410. Further, in these illustrative examples, frame 404 also may move downward during the forming of the shape for sheet metal material 410.

Stylus 406 and frame 404 may move downward in small increments. With each downward increment, platform 402 may move along X axis 420 and Y axis 422 to provide features for the shape of sheet metal material 410. This incremental movement continues until the shape of the tool is formed.

By using this type of incremental sheet metal forming process, the time and cost needed to form tools to the currently used processes is avoided. Further, through the use of sheet metal materials, increased durability is present as compared to other less expensive processes used to form tools.

Figure 5:
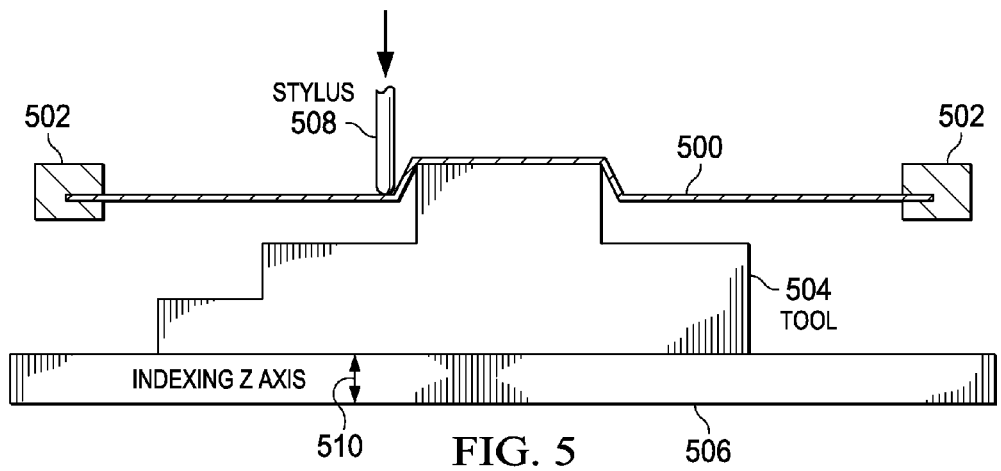
FIGS. 5, 6, and 7 are diagrams illustrating incremental sheet metal forming in accordance with an advantageous embodiment.
Figure 6:
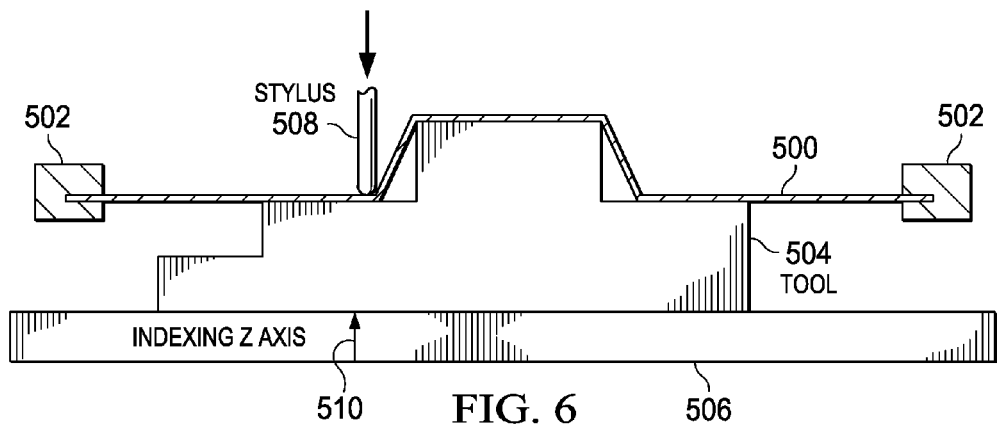
Figure 7:
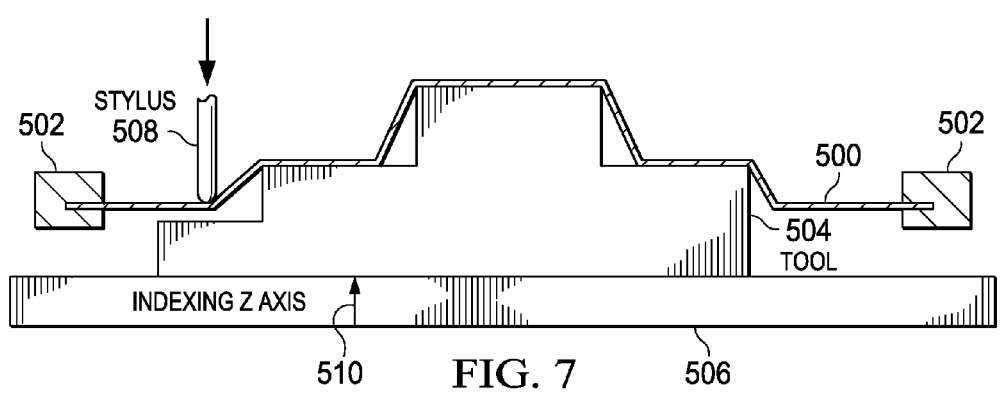

Turning now to FIGS. 5, 6, and 7, diagrams illustrating incremental sheet metal forming are depicted in accordance with an advantageous embodiment. In this example, sheet metal material 500 is held in frame 502. Forming tool 504 sits on platform 506. Stylus 508 may move along Z axis 510 to shape sheet metal material 500. Stylus 508 may move downward, while platform 506 moves upward.

Of course, in other advantageous embodiments, platform 506 may move in an X and Y direction with frame 502 moving along Z axis 510. The types of movements of the different components may vary depending on the particular implementation. In this example, frame 502 is stationary, while platform 506 moves along Z axis 510. Stylus 508 also may move along Z axis 510 as well as along the X and y axes in these examples.

In FIG. 6, platform 506 has moved along Z axis 510 in an upward motion towards stylus 508. In FIG. 7, platform 506 has moved another distance upward while stylus 508 has moved another distance downward as well as along the X and Y axis to form the shape in sheet metal material 500.

Figure 8:
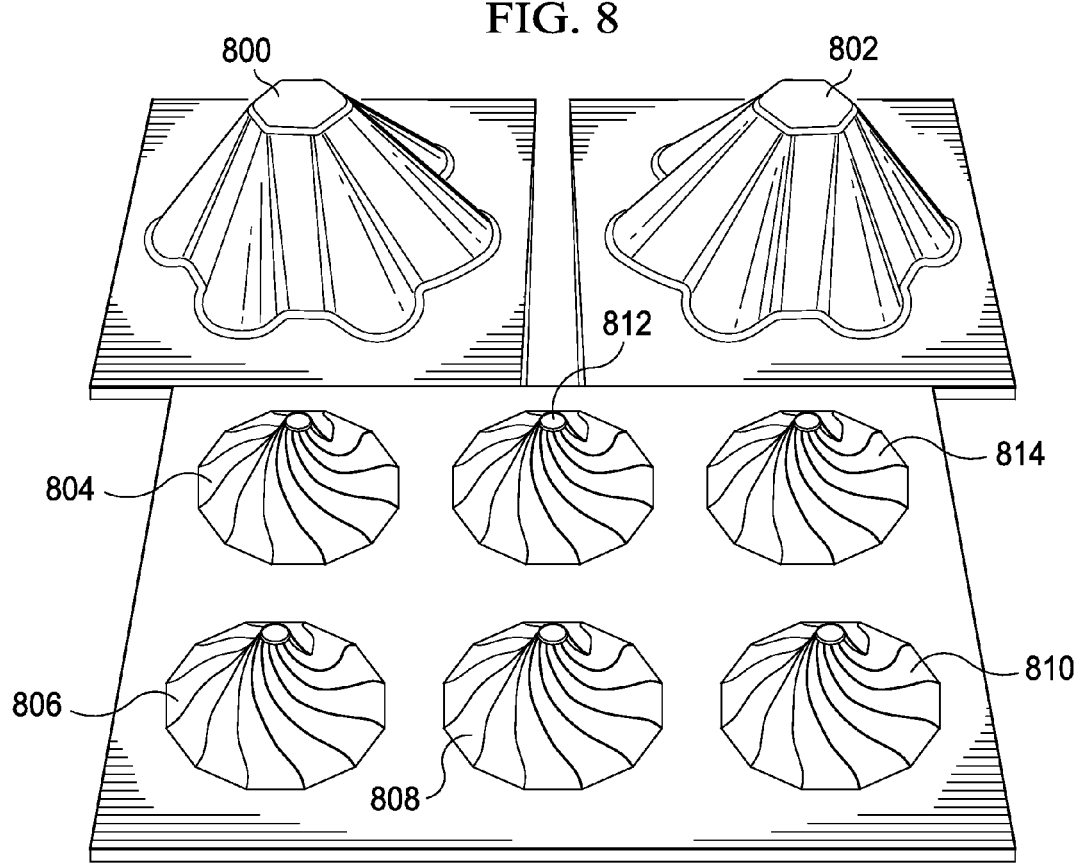
FIG. 8 is a diagram illustrating shapes formed in sheet metal materials for tools or master shapes in accordance with an advantageous embodiment.

With reference now to FIG. 8, a diagram illustrating shapes formed in sheet metal materials for tools or master shapes is depicted in accordance with an advantageous embodiment. In this example, shapes 800, 802, 804, 806, 808, 810, 812, and 814 are examples of shapes formed from sheet metal materials using an incremental sheet metal forming process. In these examples, these shapes may be either tools used to layup composite materials to form composite components, or shapes used to make molds for forming composite components.

Figure 9:
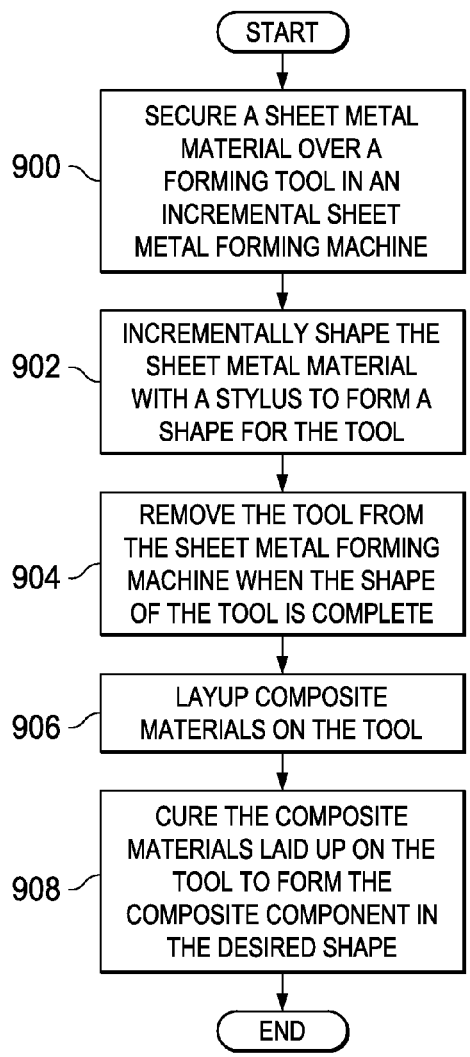
FIG. 9 is a flowchart of a process for making a tool for manufacturing composite components in accordance with an advantageous embodiment.

Turning now to FIG. 9, a flowchart of a process for making a tool for manufacturing composite components is depicted in accordance with an advantageous embodiment. The process illustrated in FIG. 9 may be implemented in a composite component manufacturing environment, such as composite component manufacturing environment 300 in FIG. 3.

The process begins by securing a sheet metal material over a forming tool in an incremental sheet metal forming machine (operation 900). This machine may take the form of incremental sheet metal forming machine 302 in FIG. 3. The process incrementally shapes the sheet metal material with a stylus to form a shape for the tool (operation 902). The process then removes the tool from the sheet metal forming machine when the shape of the tool is complete (operation 904). This tool now may be, for example, tool 310 in FIG. 3.

The process lays up composite materials on the tool (operation 906). The shape of the tool provides a desired shape of the composite component in these examples. The process then cures the composite materials laid up on the tool to form the composite component in the desired shape (operation 908), with the process terminating thereafter. In these examples, the composite materials may be laid up on the tool using composite material layup machine 306 in FIG. 3. The composite materials may be cured using oven 308 in FIG. 3.

Figure 10:
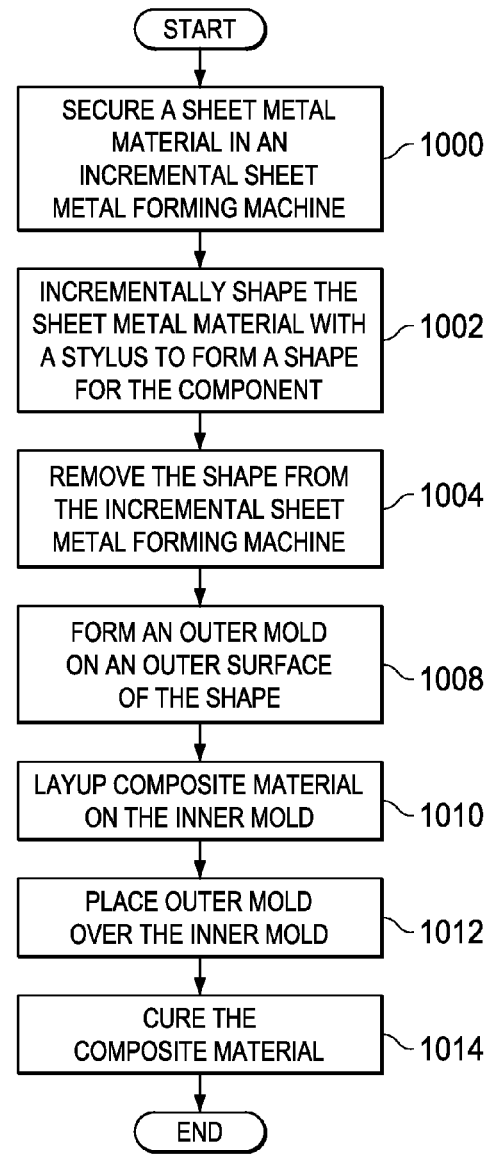
FIG. 10 is a flowchart of a process for manufacturing a composite component in accordance with an advantageous embodiment.

Turning now to FIG. 10, a flowchart of a process for manufacturing a composite component is depicted in accordance with an advantageous embodiment. The process illustrated in FIG. 10 may be implemented in an environment, such as composite component manufacturing environment 300 in FIG. 3.

The process begins by securing a sheet metal material in an incremental sheet metal forming machine (operation 1000). The process incrementally shapes the sheet metal material with a stylus to form a shape for the component (operation 1002). The process then removes the shape from the incremental sheet metal forming machine (operation 1004). The process forms an inner mold on an inner surface of the shape (operation 1006). The process also forms an outer mold on the outer surface of the shape (operation 1008). This inner mold and outer mold form a two piece mold from which composite components may be manufactured.

The process lays up composite material on the inner mold (operation 1010). The process places the outer mold over the inner mold (operation 1012). The process then cures the composite materials (operation 1014), with the process terminating thereafter. In these examples, the materials may be laid on the inside of the outer mold and then the inner mold being placed into the outer mold instead of the order of operations shown in operations 1010 and 1012.

Thus, the different advantageous embodiments provide a method and apparatus for manufacturing composite components using tools that are formed using an incremental sheet metal forming process. Sheet metal materials are incrementally shaped to a shape for a tool or a master from which molds can be made. In the different advantageous embodiments, the use of sheet metal materials provides an ability to quickly make molds for creating composite components. This is in contrast to the time needed to create a die, which may take weeks and months as opposed to around one to four hours.

Further, the different advantageous embodiments provide advantages over current cheaper cost tools formed from plastics or other more fragile materials. As a result, the tools created by the different advantageous embodiments may last longer and may be more easily repairable.

The description of the different advantageous embodiments has been presented for purposes of illustration and description, and is not intended to be exhaustive or limited to the embodiments in the form disclosed. Many modifications and variations will be apparent to those of ordinary skill in the art. Further, the different advantageous embodiments may provide different advantages as compared to other advantageous embodiments. For example, all the different illustrative examples are directed towards tools and molds made for composite components, other advantageous embodiments may be applied to create tooling and molds for other types of components.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for manufacturing a tool for creating composite components, the method comprising:
   securing a sheet metal material over a forming tool in an incremental sheet metal forming machine such that a first surface of the sheet metal material contacts the forming tool, the forming tool having a shape;
   incrementally shaping the sheet metal material with a stylus to form a shape for the tool wherein the stylus contacts a second surface of the sheet metal; and
   removing the tool from the incremental sheet metal forming machine when the shape for the tool is complete, wherein the shape of the tool is characterized by a first surface that differs from the shape of the forming tool; and laying up composite materials on the tool, wherein the shape of the tool provides a desired shape for a composite component with a composite material layup machine.

2. The method of claim 1 further comprising:
curing the composite materials laid up on the tool to form the composite component in the desired shape.

3. The method of claim 1, wherein the sheet metal material is secured in a frame and wherein the incrementally shaping step comprises:
moving the frame about a first axis and a second axis, wherein the first axis and the second axis define a plane; and
moving the stylus about a third axis, wherein the third axis is about perpendicular to the plane.

4. The method of claim 3, further comprising:
moving the frame along the third axis.

5. The method of claim 1, wherein the incrementally shaping step comprises:
pressing the stylus against the sheet metal material and the forming tool to form a shape for the tool in different locations to incrementally form the shape.

6. The method of claim 1, wherein the incrementally shaping step is controlled by a computer.

7. The method of claim 1, wherein the composite component is one of a wing panel, a fuselage, and a control surface.

8. The method of claim 1, wherein the sheet metal material is selected from one of steel alloys, aluminum alloys, nickel alloys, and titanium alloys.

9. The method of claim 1, wherein the sheet metal material has a thickness from about $5/1000$ of an inch to about $180/1000$ of an inch.

10. The method of claim 1 wherein the step of laying up composite materials comprises laying up a fabric material and a resin material.

11. The method of claim 1 wherein the step of laying up composite materials comprises laying up composite materials on the second surface of the sheet metal material.

12. The method of claim 1 wherein the step of incrementally shaping the sheet metal material with a stylus is performed such that spaces exist between first surface of the sheet metal material and the forming tool.

13. The method of claim 1 wherein the step of laying up composite materials on the tool is performed with a layup machine.

14. The method of claim 1 further comprising the step of curing the composite materials.

15. A method for manufacturing a tool for creating composite components, the method comprising:
securing a sheet metal material over a forming tool in an incremental sheet metal forming machine, wherein the forming tool is characterized by a contact surface such that a first surface of the sheet metal material contacts the contact surface of the forming tool;
incrementally shaping the sheet metal with a stylus to form a shape for the tool,
wherein the stylus contacts a second surface of the sheet metal material,
wherein the stylus moves downward in small increments,
removing the tool from the incremental sheet metal forming machine when the shape for the tool is complete;
laying up composite materials on the tool, wherein the shape of the tool provides a desired shape for a composite component in a form selected from the group consisting of an aircraft wing panel, a fuselage, a control surface, a fuselage interior subassembly, automotive composite parts, and maintenance replacement sections; and
curing the composite materials laid up on the tool to form the composite component.

* * * * *